United States Patent
Takano et al.

(10) Patent No.: US 7,566,416 B2
(45) Date of Patent: *Jul. 28, 2009

(54) STEEL PIPE FOR AN AIRBAG INFLATOR AND A PROCESS FOR ITS MANUFACTURE

(75) Inventors: Takashi Takano, Wakayama (JP); Yuji Arai, Amagasaki (JP); Kunio Kondo, Mita (JP); Keisuke Hitoshio, Hannan (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 112 days.

This patent is subject to a terminal disclaimer.

(21) Appl. No.: 11/260,369

(22) Filed: Oct. 28, 2005

(65) Prior Publication Data

US 2006/0124211 A1      Jun. 15, 2006

Related U.S. Application Data

(60) Provisional application No. 60/622,849, filed on Oct. 29, 2004.

(51) Int. Cl.
  C22C 38/18    (2006.01)
  C22C 38/00    (2006.01)
  C21D 9/08     (2006.01)
  B60R 21/26    (2006.01)

(52) U.S. Cl. .............. 420/104; 148/333; 148/593; 280/736

(58) Field of Classification Search ............. 148/570, 148/333, 593; 420/105, 104; 280/736
See application file for complete search history.

(56) References Cited

U.S. PATENT DOCUMENTS

2003/0155052 A1*  8/2003 Kondo et al. ............. 148/593
2003/0217795 A1* 11/2003 Asahi et al. ............... 148/593

FOREIGN PATENT DOCUMENTS

| EP | 1 516 935 A1 | 3/2005 |
|---|---|---|
| JP | 8-325641 | 12/1996 |
| JP | 10-140238 | 5/1998 |
| JP | 2002-194501 | 7/2002 |
| JP | 2002-294339 | 10/2002 |
| JP | 2003-171738 | 6/2003 |
| JP | 2004-107756 | 4/2004 |
| WO | 2004/003241 A1 | 1/2004 |

* cited by examiner

OTHER PUBLICATIONS

P. Spiekermann, "Alloys—a special problem of patent law?", nonpublished English translation of document, Jan. 1, 1900, pp. 1-20, XP002184689.

*Primary Examiner*—Roy King
*Assistant Examiner*—Caitlin Fogarty
(74) *Attorney, Agent, or Firm*—Clark & Brody

(57) ABSTRACT

A steel pipe for an airbag inflator having a high strength of at least 900 MPa and preferably at least 1000 MPa in tensile strength along with a high toughness and exhibiting good resistance to bursting such that it has no propagation of cracks in a burst test at −40° C. or below is manufactured by quenching a pipe of a steel comprising, in mass %, C: 0.05-0.20 %, Si: 0.1-1.0 %, P: at most 0.025 %, S: at most 0.010 %, Cr: 0.05-1.45 %, Al: at most 0.10 %, and one or both of Ti and Mn satisfying Ti≦0.02% and 0.4%≦Mn+40Ti≦1.2% from a temperature of at least the $Ac_1$ transformation point of the steel, tempering the pipe at a temperature lower than the $Ac_1$ transformation point, applying cold working to it with a reduction of area of at most 65%, and subjecting it to stress relief annealing at a temperature lower than the $Ac_1$ transformation point. The ratio L/T of the X-ray integrated intensity ratio of the {110} plane measured for the cross section perpendicular to the axial direction L of the steel pipe to that measured for the cross section perpendicular to the circumferential direction T is at most 50.

16 Claims, 1 Drawing Sheet

Fig. 1

STEEL PIPE FOR AN AIRBAG INFLATOR AND A PROCESS FOR ITS MANUFACTURE

CROSS-REFERENCE TO RELATED APPLICATIONS

This application claims priority under 35 U.S.C. 119 (e) of U.S. Provisional Application No. 60/622,849 filed Oct. 29,2004.

TECHNICAL FIELD

This invention relates to a steel pipe for an airbag inflator (a steel pipe for use in an airbag inflator) which has a high strength at the level of at least 900 MPa and preferably at least 1000 MPa in tensile strength along with good toughness and low temperature bursting resistance such that it does not undergo brittle fracture at −40° C. and preferably at −60° C. and does not have propagation of cracks in a static pressure burst test at such a low temperature, and to a process for its manufacture.

BACKGROUND ART

An airbag (air cushion) systems which are provided for the driver's seat and front passenger's seat for increasing the safety of automobiles are already becoming standard equipment. A conventional airbag system employs an explosive chemical to generate a gas to inflate an airbag. However, due to a desire for response in the speed of airbag inflation and control of the pressure of the inflating gas, another type of airbag system, which stores a high pressure gas for inflating an airbag in a steel pipe referred to as an inflator (or an accumulator), has been developed and is being increasingly employed.

A typical inflator has a structure in which a steel pipe having both ends reduced by necking is closed at one end by welding a cover plate thereto and has an airbag activating mechanism mounted at the other end. When a collision is sensed, the high pressure gas stored in the inflator is discharged all at once into the airbag. Accordingly, a steel pipe for an airbag inflator undergoes stress in an extremely short length of time at a large strain rate. Therefore, in contrast to conventional structural members such as pressure cylinders and line pipes, a steel pipe for an airbag inflator is required to have high strength, excellent resistance to bursting, and good toughness, in addition to high dimensional accuracy and good workability and weldability. Since automobiles are used even in frigid climates, the resistance to bursting should be guaranteed at a temperature as low as −40° C. or lower.

A steel pipe for an airbag which is suitable for use as an inflator and a process for its manufacture are described in JP-A 10-140238, JP-A 2002-194501, JP-A 2002-294339, and JP-A 2003-171738, for example. However, although the technology described in these patent publications aims at providing a steel pipe for an airbag inflator having high strength and high toughness, the tensile strength achieved therein is on the 800 MPa level or 900 MPa level and is at most 947 MPa, and there are no pipes which realize a high strength at the level of at least 1000 MPa along with excellent toughness.

DISCLOSURE OF THE INVENTION

As a result of the increasing trend in recent years towards decreases in the weight of automobiles in order to increase fuel efficiency, there has come to be a demand for an airbag system to be reduced in size and weight. To meet this demand, it is necessary for an inflator to have a higher pressure and a lower wall thickness. In order to realize these, there is a demand for a steel pipe for an airbag inflator having a higher tensile strength than in the past while at the same time having excellent toughness.

From the standpoint of safety, it is also important for a steel pipe for an airbag inflator to have good resistance to bursting. This good resistance to bursting is demonstrated in a static pressure burst test at −40° C. or below by no occurrence of brittle fracture and by cracks not progressing over the entire length of the steel pipe and preferably not progressing at all.

An object of the present invention is to provide a high strength steel pipe for, an airbag inflator having a high strength at the level of at least 900 MPa and preferably at least 1000 MPa and a high toughness as evidenced by 100% ductile fracture in a Charpy impact test at −40° C. or lower as well as the above-described good resistance to bursting, and a process for its manufacture.

Another object of the present invention is to provide a high strength steel pipe for an airbag inflator which, in addition to the above-described properties, has good dimensional accuracy, workability, and weldability.

According to the present invention, the above-described objects can be achieved by selecting a specific steel composition for a steel pipe and controlling cold working applied to the pipe so as to obtain a suitable steel texture.

Thus, the present invention is a steel pipe for an airbag inflator having a steel composition which comprises, in mass %, C: 0.05-0.20%, Si: 0.1-1.0%, P: at most 0.025%, S: at most 0.010%, Cr: 0.05-1.45%, Al: at most 0.10%, one or both of Ti and Mn in amounts satisfying the following equations (1) and (2), $$Ti \leq 0.02\% \tag{1}$$

$$0.4\% \leq Mn + 40Ti \leq 1.2\% \tag{2},$$

Mo: 0-1.0%, Ni: 0-1.5%, V: 0-0.2%, B: 0-0.005%, Cu: 0-0.5%, Nb: 0-0.1%, Ca: 0-0.01%, Mg: 0-0.01%, REM: 0-0.01%, and a remainder of Fe and impurities, wherein the ratio (referred to below as {110}L/T) of the X-ray integrated intensity ratio for the {110} plane measured in a cross section perpendicular to the axial direction L of the steel pipe to the X-ray integrated intensity ratio for the {110} plane measured in a cross section perpendicular to the circumferential direction T of the steel pipe is at most 50 and the steel pipe has a tensile strength of at least 900 MPa.

In one embodiment, the steel composition contains one or more elements selected from at least one group of the following groups (I), (II), and (III):

(I) one or more of Mo: 0.05-1.0%, Ni: 0.05-1.5%, V: 0.01-0.2%, and B: 0.0003-0.005%, (II) one or both of Cu: 0.05-0.5% and Nb: 0.003-0.1%, and (III) one or more of Ca: 0.0003-0.01%, Mg: 0.0003-0.01%, and REM: 0.0003-0.01%.

The value of {110}L/T is preferably at most 30 and more preferably it is at most 20 with a tensile strength of at least 1000 MPa. As a result, the toughness of the steel pipe is further improved so that brittle fracture is not exhibited in a Charpy impact test at −60° C. and good resistance to bursting is exhibited even at −60° C.

A steel pipe for an airbag inflator according to the present invention preferably does not undergo heat treatment at a temperature of the $Ac_1$ transformation point of the steel or higher after cold working. As a result, high dimensional accuracy can be guaranteed.

A steel pipe for an airbag inflator according to the present invention can be manufactured by a process which comprises making an initial pipe from a steel having a prescribed steel composition as described above, heating the pipe to a temperature of at least the $Ac_1$ transformation point of the steel followed by quenching, tempering the quenched pipe at a temperature lower than the $Ac_1$ transformation point, then performing cold working on the pipe, and preferably subsequently subjecting the pipe to stress relief annealing at a temperature lower than the $Ac_1$ transformation point.

The cold working can be carried out one time or a plurality of times. By performing this working such that the reduction of area (the total reduction of area when working is performed a plurality of times) is at most 65%, a structure satisfying the above-described requirements for {110}L/T can be obtained. In particular, when the reduction of area is at most 40%, it is possible to manufacture a steel pipe having a value of {110}L/T of at most 30 and exhibiting even better toughness and resistance to bursting.

According to the present invention, a steel pipe having high strength and excellent low temperature toughness can be stably provided with certainty. It has a high strength at the level of at least 900 MPa and preferably at least 1000 MPa in tensile strength, it shows 100% ductile fracture in a Charpy impact test at −40° C. or below and preferably at −60° C. or below, and it does not exhibiting propagation of cracks in a static pressure burst test at −40° C. and preferably −60° C. As shown below in examples, the results of a Charpy impact test and the results of a static pressure burst test closely correlate to each other. Accordingly, even if a static pressure burst test in which a steel pipe is ruptured is not actually carried out, the resistance to bursting of a steel pipe at a low temperature can be predicted from the results of a Charpy impact test.

This steel pipe for an airbag inflator can be manufactured without performing heat treatment at a temperature above the $Ac_1$ transformation point after cold working, so it has good dimensional accuracy, and its workability and weldability are also good. The present invention makes it possible to reduce the size and weight of an airbag system, so it contributes to an improvement in the fuel efficiency of automobiles.

BEST MODE FOR CARRYING OUT THE INVENTION (A) Chemical Composition of the Steel

A steel pipe for an airbag inflator according to the present invention has the above-described specific steel composition. This steel composition has Ti and Mn contents which satisfy the following Equations (1) and (2) (in the equations, Ti and Mn mean their respective contents in mass %):

$$Ti \leq 0.02\% \quad (1)$$

$$0.4\% \leq Mn + 40Ti \leq 1.2\% \quad (2)$$

The content of either one of Ti and Mn may be zero percent.

The reasons why the ranges for the contents of each of the elements in a steel composition according to the present invention are limited as described above are as follows. Percents in the steel composition are all mass percents.

C: 0.05-0.20%

Carbon (C) is an element which is effective for inexpensively increasing the strength of steel. If the content thereof is less than 0.05%, it is difficult to obtain a desired tensile strength of at least 900 MPa and preferably at least 1000 MPa. On the other hand, if the C content exceeds 0.20%, workability and weldability decrease. A preferred range for the C content is 0.08-0.20%, and a more preferred range is 0.12-0.17%.

Si: 0.1-1.0%

Silicon (Si) has a deoxidizing action, and it also increases the hardenability and strength of steel. In order to adequately obtain these effects, the Si content is made at least 0.1%. However, if the Si content exceeds 1.0%, toughness decreases. A preferred range for the Si content is 0.2-0.5%.

P: at most 0.025%

Phosphorus (P) brings about a decrease in toughness caused by grain boundary segregation. The decrease in toughness becomes particularly marked when the P content exceeds 0.025%. The P content is preferably at most 0.020% and even more preferably at most 0.015%.

S: at most 0.010%

Sulfur (S) decreases toughness particularly in the T direction, i.e., the circumferential direction of a steel pipe. In particular, if the S content exceeds 0.010%, there is a marked decrease in toughness in the T direction of a steel pipe. The S content is preferably at most 0.005%, and still more preferably at most 0.003%.

Cr: 0.05-1.45%

Chromium (Cr) is effective for increasing the strength and toughness of steel. If the content thereof is less than 0.05%, it is difficult to obtain this effect. However, if its content exceeds 1.45%, it leads to a decrease in the toughness of welds. A preferred range for the Cr content is 0.2-1.0%, and a more preferred range is 0.4-0.8%.

Al: at most 0.10%

Aluminum (Al) is an element which has a deoxidizing action and which is effective for increasing toughness and workability. However, the presence of Al in an amount exceeding 0.10% causes sand marks to occur markedly. The Al content may be on the level of an impurity, so it has no particular lower limit, but it is preferably at least 0.005%. A preferred range for the Al content is 0.005-0.05%. In the present invention, the Al content refers to the content of acid soluble Al (so-called sol. Al).

With the above-described basic steel composition, in order to guarantee toughness required for a steel pipe for an airbag inflator and to obtain a high strength at the level of at least 900 MPa and preferably at least 1000 MPa, the Mn and Ti contents are controlled so as to satisfy the above-described Equations (1) and (2).

Ti: 0-0.02%

It is not necessary to add titanium (Ti) to a steel composition of the present invention, but when it is added, its content is made at most 0.02% so as to satisfy Equation (1). There is no particular lower limit, and it may be present on the level of an impurity.

If added, Ti is an element which has a deoxidizing action. In addition, it has a strong affinity for N, and at high temperatures, it stably exists as a Ti nitride. Accordingly, it suppresses crystal grain growth at the time of hot rolling and contributes to an increase in toughness. In order to obtain such an effect from Ti, the Ti content is preferably at least 0.003%. However, if the Ti content exceeds 0.02%, toughness ends up decreasing. Accordingly, Ti is preferably added in the range of 0.003-0.02%.

Mn: at most 1.2%

Manganese (Mn) is an element which has a deoxidizing action and which is effective for increasing the hardenability of steel and for increasing strength and toughness, so it may be present in an amount of up to 1.2%. A sufficient hardness and toughness may not be obtained when the content thereof is less than 0.20%, so the Mn content is preferably at least 0.20%. On the other hand, if the Mn content exceeds 1.0%, MnS may coarsen, and the coarsened MnS, when extended during hot rolling, causes toughness to decrease. Therefore, the Mn content is preferably 0.20-1.0% and more preferably 0.4-0.8%.

The Ti and Mn contents are controlled so as to satisfy Equation (2). If the value of (Mn+40Ti) is less than 0.4% or greater than 1.2%, the desired high strength and/or high toughness cannot be obtained. The value of (Mn+40Ti) is preferably at least 0.6% and at most 1.0%.

With the object of further improving the strength, resistance to bursting, and/or weldability of a steel, in addition to the above-described elements, one or more of Mo, Ni, Cu, V, Nb, B, Ca, Mg, and REM may be added within the below-described ranges to the steel composition for a steel pipe according to the present invention.

Mo, Ni, B, V:

Each of molybdenum (Mo), nickel (Ni), boron (B), and vanadium (V) has the effect of increasing hardenability, so one or more of these may be added as an optional element as necessary.

Mo also has the effect of increasing strength through solid-solution hardening and precipitation hardening. These effects of Mo are obtained even when its content is on the level of an impurity, but in order to obtain a more appreciable effect, the content of Mo is preferably at least 0.05%. However, if the content of Mo exceeds 0.50%, welds are hardened and hence have decreased toughness. Therefore, when it is added, the content of Mo is preferably 0.05-1.0%, more preferably 0.05-0.50%, and still more preferably 0.1-0.40%.

Ni also has the effect of increasing toughness. This effect of Ni is obtained even when its content is on the level of an impurity, but in order to obtain a more appreciable effect, the content of Ni is preferably at least 0.05%. However, Ni is an expensive element, and costs increase markedly particularly when the content thereof exceeds 1.5%. Therefore, when Ni is added, its content is preferably 0.05-1.5% and more preferably 0.1-1.0%.

The effect of B on increasing hardenability is obtained even when its content is on the level of an impurity, but in order to obtain a more appreciable effect, the content of B is preferably at least 0.0003%. However, if the content of B exceeds 0.005%, toughness decreases. Therefore, when B is added, its content is preferably 0.0003-0.005%. A more preferred range for the B content is 0.0003-0.002%.

The effect of V on increasing hardenability is obtained even when its content is on the level of an impurity. V also has the effect of increasing strength through precipitation hardening. This effect of V is obtained when its content is at least 0.01%, but if its content exceeds 0.2%, toughness decreases. Accordingly, when V is added, its content is preferably 0.01-0.2%. A more preferred range for the content of V is 0.03-0.10%.

Cu, Nb:

Each of copper (Cu) and niobium (Nb) has the effect of increasing toughness, so if necessary, one or both of these elements may be added as optional elements.

The effect of Cu on increasing toughness can be obtained even when its content is on the level of an impurity, but in order to obtain a more appreciable effect, the Cu content is preferably at least 0.05% and more preferably at least 0.1%. However, Cu decreases the hot workability of steel, so when Cu is added, Ni is preferably also added in order to guarantee hot workability. If the content of Cu exceeds 0.5%, it may not be possible to guarantee good hot workability even if Ni is also added. Accordingly, the content of Cu when it is added is preferably 0.05-0.5%.

The effect of Nb on increasing toughness can be obtained even when its content is on the level of an impurity, but in order to obtain a more appreciable effect, the Nb content is preferably at least 0.003% and more preferably at least 0.005%. However, if the content of Nb exceeds 0.1%, toughness ends up decreasing. Accordingly, when it is added, the content of Nb is preferably 0.003-0.1%. A more preferred range for the Nb content is 0.003-0.03% and a still more preferred range is 0.005-0.02%.

Ca, Mg, REM:

When it is desired to guarantee even better resistance to bursting for a steel pipe for an airbag inflator, one or more of calcium (Ca), magnesium (Mg), and rare earth metals (REM) may be added as necessary as an optional element.

Each of these elements has the effect of further increasing the resistance to bursting by improving the anisotropy of toughness and increasing the toughness in the T direction of a steel pipe. This effect can be obtained even when the content is on the level of an impurity, but in order to obtain a more appreciable effect, the content of any of these elements is preferably at least 0.0003%. However, if the content of any of these elements exceeds 0.01%, inclusions form in clusters, leading to the occurrence of sand marks. Accordingly, the content of each of these elements when added is preferably 0.0003-0.01% and more preferably 0.0005-0.003%.

(B) {110}L/T

Figure 1:
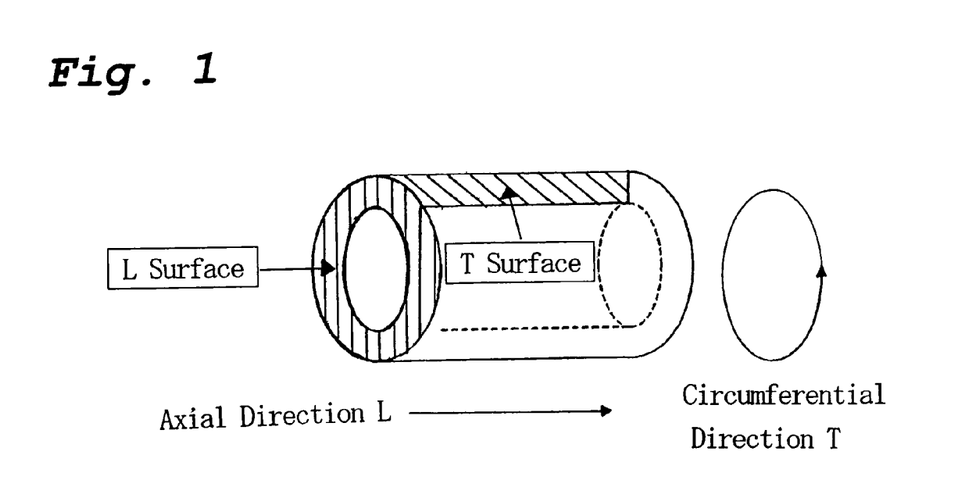
FIG. 1 is a schematic diagram which explains the surface perpendicular to the axial direction L of a steel pipe (the L surface) and the surface perpendicular to the circumferential direction T of the steel pipe (the T surface).

As shown in FIG. 1, when the X-ray integrated intensity ratio is measured for the {110} plane both in a cross section perpendicular to the axial direction L of the steel pipe (the surface shown by vertical hatching and referred to below as the L surface) and in a cross section perpendicular to the circumferential direction T (the surface shown by diagonal hatching and referred to below as the T surface), the ratio of the X-ray integrated intensity ratio on the L surface to the X-ray integrated intensity ratio on the T surface is referred to as {110}L/T.

As is discussed in JP-A 2003-171738, the X-ray integrated intensity ratio measured for the {110} plane of steel greatly varies with the manufacturing conditions, and the ratio of the X-ray integrated intensity ratio for the {110} plane on the L surface to that on the T surface (i.e., {1 1 O}L/T) can be used as a parameter to evaluate the anisotropy between the L direction and the T direction of the texture of steel. The X-ray integrated intensity ratio is a value calculated by dividing the area of a peak assigned to a given plane orientation such as the {110} plane on a chart of an X-ray diffraction pattern obtained with a cross-sectional sample by the area of a peak assigned to the same plane orientation on a chart obtained with a sample having a random crystal orientation such as a powder sample.

In a steel pipe according to the present invention, the value of {110}L/T which is the ratio of the X-ray integrated intensity ratio for the {110} plane measured on the L surface to the X-ray integrated intensity ratio for the {110} plane measured on the T surface is at most 50. If {110}L/T exceeds 50, the anisotropy of the texture becomes so great that the toughness of the steel pipe decreases. As a result, brittle fracture occurs during a Charpy impact test at −40° C., and good resistance to bursting at a temperature of −40° C. (no propagation of cracks in a static pressure burst test) can not be exhibited.

Preferably the value of {110}L/T is at most 30. More preferably it is at most 20, and the tensile strength is at least 1000 MPa. A steel pipe for which this value is at most 30 or at most 20 with a tensile strength of at least 1000 MPa has a higher toughness. Thus, it does not undergo brittle fracture in a Charpy impact test at −60° C. and exhibits good resistance to bursting at −60° C.

The value of {110}L/T of a steel pipe varies primarily with the degree of working (reduction of area) at the time of cold working, and there is a tendency for {110}L/T to increase as the reduction of area increases. Accordingly, in a process of manufacturing a steel pipe according to the present invention, cold working of an initial pipe is preferably carried out such that {110}L/T is at most 50. However, if the steel composition defined by the present invention is satisfied and if {110}L/T is at most 50, a steel pipe will be obtained which satisfies both the above-described high strength and high toughness, so a steel pipe according to the present invention can be manufactured by a process other than the manufacturing process described below.

(C) Manufacturing Process

A steel pipe for an airbag inflator according to the present invention can be manufactured by subjecting an initial pipe made from a steel having the above-described composition to the following steps in this order: heating to a temperature of at least the $Ac_1$ transformation point of the steel followed by quenching, tempering at a temperature lower than the $Ac_1$ transformation point, cold working, and preferably stress relief annealing at a temperature lower than the $Ac_1$ transformation point.

The initial pipe may be either a seamless steel pipe or a welded steel pipe, but a seamless steel pipe is preferred from the standpoint of reliability. There are no particular limitations on a method of making a seamless steel pipe or a welded steel pipe.

In order to provide the steel pipe with the required tensile strength, it is hardened by heating to at least the $Ac_1$ point and subsequent quenching, and then tempering is carried out at a temperature lower than the $Ac_1$ point.

If the heating temperature prior to quenching is lower than the $Ac_1$ transformation point, the necessary high strength and toughness can not be guaranteed. The above-described heating temperature is preferably a temperature equal to or higher than the $Ac_3$ transformation point of the steel, which is in the austenite region.

Heating at a high temperature for a long period causes a large amount of scale to be formed on the surface of a steel pipe, and may decrease the surface quality and resistance to bursting. Therefore, the heating is preferably carried out by rapid heating to a predetermined temperature followed by a short retention period. The rapid heating may be performed at a rate of temperature increase of at least 10° C./sec. Such rapid heating can be achieved by high frequency induction heating or direct resistance heating, for example, but there are no particular restrictions on the heating method. A preferred heating method is high frequency induction heating.

Particularly in the case of such rapid heating for a short period, a preferred heating temperature is in the range of from 900 to 1000° C. and most preferably from 900 to 960° C. If the heating temperature is lower than 900° C., complete austenitization may not be achieved during heating for a short period, thereby making it impossible to form a desired microstructure. If the heating temperature exceeds 1000° C., γ grains may be coarsened and toughness may be decreased.

The heating to a temperature of at least the $Ac_1$ transformation point is preferably performed in an atmosphere having as low an oxygen potential as possible from the standpoint of suppressing the formation of surface scale. A reducing atmosphere is even more preferred.

Cooling after the steel pipe is heated at a temperature of at least the $Ac_1$ transformation point and preferably at least the $Ac_3$ transformation point is conducted by quenching (preferably at an average cooling rate of at least 5° C./sec in the temperature range of 850-500° C.) in order to obtain a desired high strength in a stable and reliable manner. Preferably, the cooling rate is at least 20° C./sec. Such quenching may be performed by water quenching or similar method.

A steel pipe which is cooled to approximately room temperature by quenching is then tempered at a temperature of the $Ac_1$ transformation point or lower in order to provide the pipe with the desired high strength and good resistance to bursting. It is difficult to obtain the above-described properties in a stable and a reliable manner if the temperature of tempering exceeds the $Ac_1$ transformation point. The tempering is preferably carried out by maintaining the steel pipe for at least 20 minutes at a temperature in the range of 450-650° C.

An initial pipe which has undergone hardening and tempering in this matter is then subjected to cold working to finish it to desired dimensions and surface condition. There is no particular limitation on the method of cold working, but normally it is carried out by cold drawing or cold rolling.

In the process of the present invention, after this cold working, the pipe is not subjected to heat treatment at a temperature of the $Ac_1$ point or higher, so the degree of working in this cold working governs the anisotropy of the texture of the steel pipe, i.e., the value of {110}L/T. Namely, as the degree of working increases, there is a tendency for anistropy and hence the value of {110}L/T to increase. For this reason, cold working is preferably carried out such that the reduction of area is at most 65%. If the reduction of area becomes greater than 65%, the value of {110}L/T of the steel pipe after working may become greater than 50. The reduction of area is preferably at most 40%. As a result, it becomes possible to obtain a steel pipe having high strength and excellent toughness in which the value of {110}L/T is as low as at most 30 so that the pipe exhibits good resistance to bursting even at −60° C.

Cold working can be performed two or more times. In this case, the total reduction of area is made at most 65%.

After cold working, stress relief annealing at a temperature lower than the $Ac_1$ transformation point is preferably carried out in order to remove strains which were introduced during cold working without reducing toughness. When cold working is carried out two or more times, this stress relief annealing is preferably carried out after each time cold working is performed. The stress relief annealing is preferably carried out by holding the pipe in a temperature range of 400-650° C. for at least 10 minutes. However, the lower end of this temperature range may possibly come into the blue brittleness temperature range of the steel, so stress relief annealing is preferably carried out at a higher temperature within this range such as at least 450° C. and more preferably at least 500° C. On the other hand, the tensile strength of a steel pipe varies with the conditions of this stress relief annealing, and a lower temperature produces a higher tensile strength. By appropriately selecting the conditions of stress relief annealing, a steel pipe with a high strength at the level of at least 1000 MPa can be obtained without causing blue brittleness.

Thus, according to the present invention, a steel pipe for an airbag inflator having a high strength at the level of at least 900 MPa and preferably at least 1000 MPa in tensile strength along with good toughness such that it exhibits 100% ductile fracture in a Charpy impact test at −40° C. or below and preferably at −60° C. or below and does not have propagation of cracks in an internal pressure burst test at −40° C. and preferably at −60° C. can be realized. Accordingly, a steel pipe for an airbag inflator according to the present invention can fully cope with increases in pressure and decreases in the wall thickness of an airbag inflator.

EXAMPLES

The present invention will be illustrated by the following examples. These examples should be construed in all respects as illustrative and not restrictive. In the examples, Steels Nos. 1-21 having the compositions shown in Table I were used, and they had $Ac_1$ transformation points in the range of 700 to 760° C. and $Ac_3$ transformation points in the range of 820 to 880° C.

Example 1

Using steel billets having the chemical compositions shown in Table 1, initial pipes in the form of seamless steel pipes having nominal dimensions of an outer diameter of 42.7 mm and a wall thickness of 3.9 mm were made by a hot working method which included heating to 1250° C. and then performing piercing and rolling by a conventional Mannesmann piercer-mandrel mill system. Of the steel compositions shown in Table 1, Nos. 17-19 had a value of (Mn+40Ti) which was outside of the range defined by the present invention, and Nos. 20 and 21 had a Cr content which was outside of the range defined therein. Each of these was a comparative steel.

As summarized in Table 2, each initial pipe was heated for 10 minutes at 920° C. in a conventional walking beam furnace (at rate of temperature increase of 0.3° C./second in an atmosphere of air) and then water quenched by water cooling (in Table 2, the heating temperature is indicated by Q), after which it was tempered at a temperature which was no higher than the $Ac_1$ transformation point (the temperature being shown by T in Table 2) in a walking beam furnace (atmosphere: air) for 30 minutes. During the water cooling, the cooling rate in a temperature range of 850-500° C. was at least 20° C./second. Then, cold working was applied to the initial pipe by drawing. In this example, as shown in Table 2, cold drawing was carried out two times, and the total reduction of area was 63.2%. After each time cold drawing was performed, stress relief annealing was carried out at a temperature lower than the $Ac_1$ transformation point (the temperature being shown by SR in Table 2) for 20 minutes, and a steel pipe having an outer diameter of 24.0 mm and a wall thickness of 2.60 mm was obtained.

Example 2

Steel pipes were manufactured in the same manner as in Example 1, but in this example, as shown in Table 2, of the cold drawing which was carried out two times in Example 1, the second cold drawing and the subsequent stress relief annealing were not carried out. Accordingly, the reduction of area by cold drawing was 39.1%, and the final-shape of the steel pipe was an outer diameter of 32.0 mm and a wall thickness of 3.20 mm.

Comparative Example 1

A steel pipe was manufactured in the same manner as in Example 1, but the shape of the initial pipe was an outer diameter of 50.8 mm and a wall thickness of 4.8 mm. After the initial pipe was subjected to heat treatment for hardening and tempering in the same manner as in Example 1, as shown in Table 2, cold drawing was performed three times. After each time that drawing was performed, stress relief annealing was carried out in the same manner as in Example 1. The total reduction of area by cold drawing was 74.8%, and the final shape of the steel pipe was an outer diameter of 24.0 mm and a wall thickness of 2.60 mm. As described below, in a steel pipe manufactured in this example, the reduction of area by cold working was too high, so the value of {110}L/T was greater than 50 for each steel type. Accordingly, the steel pipes of this example were all comparative examples.

Example 3

A steel pipe was manufactured in the same manner as in Example 1, but the shape of the initial pipe was an outer diameter of 50.8 mm and a wall thickness of 4.0 mm. After the initial pipe was subjected to heat treatment for hardening and tempering in the same manner as in Example 1, as shown in Table 2, cold drawing was carried out one time with a reduction of area of 40.7%, and then stress relief annealing was carried out in the same manner as in Example 1. The final shape of the steel pipe was an outer diameter of 40.0 mm and a wall thickness of 3.00 mm.

Example 4

A steel pipe was manufactured in the same manner as in Example 1, but the shape of the initial pipe was the same as for Example 3 with an outer diameter of 50.8 mm and a wall thickness of 4.0 mm. After the initial pipe was subjected to heat treatment for hardening and tempering in the same manner as in Example 1, as shown in Table 2, cold drawing was carried out one time with a reduction of area of 23.4%, and then stress relief annealing was carried out in the same manner as in Example 1. The final shape of the steel pipe was an outer diameter of 45.0 mm and a wall thickness of 3.45 mm.

TABLE 1

| Steel No. | Steel Compositioni (mass %) | | | | | | | | | | | | | | | | | |
|---|---|---|---|---|---|---|---|---|---|---|---|---|---|---|---|---|---|---|
| | C | Si | Mn | P | S | Cr | Ti | sol.Al | Mo | Ni | V | B | Cu | Nb | Ca | Mg | REM | Mn + 40Ti |
| 1 | 0.15 | 0.31 | 0.81 | 0.007 | 0.001 | 0.63 | 0.008 | 0.035 | — | — | — | — | — | — | — | — | — | 1.13 |
| 2 | 0.15 | 0.30 | 0.55 | 0.015 | 0.002 | 0.56 | 0.001 | 0.035 | 0.29 | — | — | — | — | — | — | — | — | 0.59 |
| 3 | 0.14 | 0.31 | 0.45 | 0.015 | 0.002 | 0.52 | 0.002 | 0.029 | — | 0.22 | — | — | — | — | — | — | — | 0.53 |
| 4 | 0.16 | 0.29 | 0.53 | 0.011 | 0.001 | 0.64 | 0.009 | 0.032 | — | — | 0.05 | — | — | — | — | — | — | 0.89 |

TABLE 1-continued

| Steel No. | C | Si | Mn | P | S | Cr | Ti | sol.Al | Mo | Ni | V | B | Cu | Nb | Ca | Mg | REM | Mn + 40Ti |
|---|---|---|---|---|---|---|---|---|---|---|---|---|---|---|---|---|---|---|
| 5 | 0.16 | 0.34 | 0.41 | 0.012 | 0.001 | 0.61 | 0.011 | 0.033 | — | — | — | 0.0011 | — | — | — | — | — | 0.85 |
| 6 | 0.09 | 0.31 | 0.47 | 0.009 | 0.002 | 0.60 | 0.013 | 0.033 | 0.32 | 0.25 | — | — | — | — | — | — | — | 0.99 |
| 7 | 0.15 | 0.32 | 0.45 | 0.008 | 0.001 | 0.56 | 0.011 | 0.033 | 0.17 | — | — | 0.0021 | — | — | — | — | — | 0.89 |
| 8 | 0.16 | 0.35 | 0.45 | 0.009 | 0.002 | 0.58 | 0.013 | 0.025 | — | — | — | — | 0.33 | — | — | — | — | 0.97 |
| 9 | 0.13 | 0.27 | 0.43 | 0.012 | 0.002 | 0.55 | 0.011 | 0.022 | — | — | — | — | — | 0.018 | — | — | — | 0.87 |
| 10 | 0.15 | 0.30 | 0.50 | 0.008 | 0.001 | 0.60 | 0.011 | 0.035 | 0.32 | 0.24 | — | — | 0.32 | 0.025 | — | — | — | 0.94 |
| 11 | 0.15 | 0.30 | 0.51 | 0.015 | 0.002 | 0.62 | 0.008 | 0.029 | — | — | — | — | — | — | 0.0023 | — | — | 0.83 |
| 12 | 0.14 | 0.32 | 0.44 | 0.013 | 0.002 | 0.66 | 0.009 | 0.032 | — | — | — | — | — | — | — | 0.0008 | — | 0.80 |
| 13 | 0.16 | 0.29 | 0.55 | 0.012 | 0.001 | 0.64 | 0.011 | 0.033 | — | — | — | — | — | — | — | — | 0.0015 | 0.99 |
| 14 | 0.16 | 0.34 | 0.52 | 0.012 | 0.001 | 0.59 | 0.013 | 0.033 | 0.31 | — | — | — | — | — | 0.0021 | — | — | 1.04 |
| 15 | 0.15 | 0.32 | 0.45 | 0.008 | 0.002 | 0.56 | 0.013 | 0.025 | — | — | — | — | 0.25 | 0.021 | 0.0021 | 0.0011 | — | 0.97 |
| 16 | 0.16 | 0.33 | 0.43 | 0.009 | 0.001 | 0.58 | 0.011 | 0.022 | 0.30 | 0.25 | — | — | 0.30 | 0.022 | 0.0023 | — | — | 0.87 |
| 17 | 0.15 | 0.31 | 1.51 | 0.008 | 0.001 | 0.60 | 0.009 | 0.035 | — | — | — | — | 0.31 | 0.019 | — | — | — | 1.87 |
| 18 | 0.16 | 0.30 | 0.62 | 0.015 | 0.002 | 0.56 | 0.019 | 0.035 | 0.29 | — | — | — | — | — | — | — | — | 1.38 |
| 19 | 0.12 | 0.31 | 0.23 | 0.008 | 0.001 | 0.56 | 0.004 | 0.035 | — | — | — | — | — | — | — | — | — | 0.39 |
| 20 | 0.15 | 0.30 | 0.70 | 0.015 | 0.002 | 1.54 | 0.011 | 0.035 | — | — | 0.02 | — | — | — | — | — | — | 1.14 |
| 21 | 0.15 | 0.30 | 0.65 | 0.015 | 0.002 | — | 0.011 | 0.035 | 0.29 | — | — | — | — | 0.021 | — | — | — | 1.09 |

TABLE 2

| Step | Example 1 | Example 2 | Comparative Example 1 | Example 3 | Exanple 4 |
|---|---|---|---|---|---|
| Hot pipe making (piercing, rolling) | O.D.: 42.7 mm W.T.: 3.9 mm | O.D.: 42.7 mm W.T.: 3.9 mm | O.D.: 50.8 mm W.T.: 4.8 mm | O.D.: 50.8 mm W.T.: 4.0 mm | O.D.: 50.8 mm W.T.: 4.0 mm |
| Heating temp. for quenching | Q: 920° C. | Q: 920° C. | Q: 920° C. | Q: 920° C. | Q: 920° C. |
| Temperature for tempering | T: Below $Ac_1$ | T: Below $Ac_1$ | T: Below $Ac_1$ | T: Below $Ac_1$ | T: Below $Ac_1$ |
| First cold drawing | O.D.: 32.0 mm W.T.: 3.20 mm R.O.A.: 39.1% | O.D.: 32.0 mm W.T.: 3.20 mm R.O.A.: 39.1% | O.D.: 42.7 mm W.T.: 3.9 mm R.O.A.: 31.5% | O.D.: 40.0 mm W.T.: 3.00 mm R.O.A.: 40.7% | O.D.: 45.0 mm W.T.: 3.45 mm R.O.A.: 23.4% |
| First stress release annealing | SR: Below $Ac_1$ | SR: Below $Ac_1$ | SR: Below $Ac_1$ | SR: Below $Ac_1$ | SR: Below $Ac_1$ |
| Second cold drawing | O.D.: 24.0 mm W.T.: 2.60 mm R.O.A.: 39.6% (Total 63.2%) | | O.D.: 32.0 mm W.T.: 3.20 mm R.O.A.: 39.1% (Total 58.3%) | | |
| Second stress release annealing | SR: Below $Ac_1$ | | SR: Below $Ac_1$ | | |
| Third cold drawing | | | O.D.: 24.0 mm W.T.: 2.60 mm R.O.A.: 39.6% (Total 74.8%) | | |
| Third stress release annealing | | | SR: Below $Ac_1$ | | |

O.D. = Outer Diameter;
W.T. = Wall Thickness;
R.O.A. = Reduction of Area

For each of the steel pipes manufactured according to the above examples and comparative example, measurement of the X-ray integrated intensity ratio of the {110} plane for determining {110}L/T, a Charpy test and a tensile strength test in the direction, and a burst test were carried out in the following manner.

<Measurement of X-Ray Integrated Intensity Ratio>

A portion of certain length was cut from each steel pipe, and it was unrolled by cutting in the axial direction of the pipe at room temperature. From the unrolled steel pipe, a sample which exposed a cross section perpendicular to the axial direction L (surface L in FIG. 1) and a sample which exposed a cross section perpendicular to the circumferential direction T (surface T in FIG. 1) were taken to prepare test pieces for measurement of the L surface and the T surface, respectively. On a chart of an X-ray diffraction pattern in which the abscissa is the diffraction angle 2θ obtained from each of these cross-sectional test pieces for the L surface and the T surface, the area of a peak (i.e., the X-ray integrated intensity) assigned to the {110} plane was measured. The X-ray integrated intensity ratio for the {110} plane was calculated for each of the L surface and the T surface by dividing the measured peak area by the peak area of the same plane orientation measured in the same manner with a powder sample having a random crystal orientation. The value of {110}L/T was calculated by dividing the X-ray integrated intensity ratio for the L surface by the X-ray integrated intensity ratio for the T surface.

<Charpy Test and Tensile Strength Test for the T Direction>

A portion of certain length was cut from each steel pipe, and the piece was unrolled by cutting in the axial direction of the pipe (the L direction) at room temperature. V-notch Charpy test pieces prescribed by JIS Z 2002 having a width of 2.5 mm were taken from the unrolled pipe in the circumferential direction (the T direction) (such that the longitudinal sides of the test pieces extended along the T direction), and they were subjected to a Charpy impact test at various temperatures below room temperature to determine the percent of area of ductile fracture in the fractured surface. The test results are shown by the lowest temperature which could show 100% ductile fracture (referred to below as vTrs100).

The lower is this temperature, the greater is the toughness.

The tensile strength was measured in accordance with the tensile test method for metallic materials set forth in JIS Z 2241 using a Number 11 test piece in accordance with JIS Z 2201, which was taken in the T direction in the same manner as described above.

<Static Pressure Burst Test>

Three steel pipe test pieces measuring 250 mm long were cut from each steel pipe so that static pressure burst test was performed three times for each steel pipe.

The temperature for the burst test was made −60° C. for Examples 2 and 4 in which steel pipes had a value of vTrs of −60° C. or below, and was made −40° C. for the remaining Examples 1 and 3 and Comparative Example 1.

The test was carried out by closing off both ends of a 250 mm long steel pipe test piece by cover plates which were welded to the ends, and applying an increasing static pressure with a liquid at −40° C. or −60° C. to the inside of the pipe until bursting (rupture) of the pipe occurred. Upon visual observation of the periphery of the burst portion (the ruptured portion) of the burst pipe, the resistance to bursting was evaluated by the degree of propagation of cracks on both sides of the burst portion in the manner shown in Table 3.

TABLE 3

| Shape of the burst portion after static pressure burst test | Mark | Criteria |
|---|---|---|
|  | ○ | No propagation of the cracks in burst portion. Both ends of burst portion have a curvature or are curved with respect to axial direction of pipe. |
|  | △ | Cracks do not propagate to the ends, but the ends of the burst portion extend in a straight line in axial direction of pipe. |
|  | X | Cracks propagate to one or both ends of the burst portion. |

The results of the above-described tests are compiled in Table 4. In Table 4, the results of the burst test are shown with the mark indicated in Table 3 for each of the three steel pipes which were tested. The other test results are the average of three measurements.

TABLE 4-1

| | Example 1 | | | | Example 2 | | | | Comparative Example 1 | | | |
|---|---|---|---|---|---|---|---|---|---|---|---|---|
| Steel No. | {110}L/T | TS [MPa] | vTrs100 [° C.] | Burst test (−40° C.) | {110}L/T | TS [MPa] | vTrs100 [° C.] | Burst test (−60° C.) | {110}L/T | TS [MPa] | vTrs100 [° C.] | Burst test (−40° C.) |
| 1 | 46.4 | 912 | −40 | ○○○ | 24.2 | 916 | −65 | ○○○ | 53.6 | 917 | −15 | XXX |
| 2 | 45.7 | 922 | −40 | ○○○ | 25.8 | 923 | −65 | ○○○ | 54.2 | 920 | −15 | XXX |
| 3 | 43.6 | 923 | −40 | ○○○ | 27.7 | 927 | −65 | ○○○ | 58.4 | 928 | −15 | XXX |
| 4 | 42.9 | 915 | −40 | ○○○ | 24.6 | 916 | −65 | ○○○ | 53.9 | 913 | −15 | XXX |
| 5 | 45.3 | 911 | −40 | ○○○ | 23.7 | 918 | −65 | ○○○ | 55.8 | 921 | −15 | XXX |
| 6 | 46.1 | 930 | −45 | ○○○ | 23.2 | 939 | −70 | ○○○ | 56.2 | 935 | −20 | XXX |
| 7 | 45.5 | 928 | −45 | ○○○ | 24.5 | 931 | −70 | ○○○ | 58.1 | 935 | −20 | XXX |
| 8 | 44.5 | 925 | −40 | ○○○ | 24.8 | 926 | −65 | ○○○ | 57.6 | 923 | −20 | XXX |
| 9 | 43.8 | 932 | −40 | ○○○ | 25.8 | 921 | −65 | ○○○ | 57.3 | 935 | −20 | XXX |
| 10 | 42.3 | 945 | −45 | ○○○ | 27.6 | 946 | −70 | ○○○ | 56.8 | 942 | −25 | XXX |
| 11 | 42.7 | 929 | −40 | ○○○ | 25.2 | 924 | −65 | ○○○ | 57.9 | 928 | −20 | XXX |
| 12 | 45.2 | 925 | −40 | ○○○ | 24.3 | 921 | −65 | ○○○ | 55.6 | 925 | −20 | XXX |
| 13 | 44.7 | 924 | −40 | ○○○ | 24.5 | 930 | −65 | ○○○ | 58.0 | 928 | −20 | XXX |
| 14 | 44.3 | 960 | −40 | ○○○ | 23.9 | 954 | −65 | ○○○ | 54.8 | 956 | −20 | XXX |
| 15 | 42.6 | 965 | −45 | ○○○ | 23.6 | 964 | −70 | ○○○ | 56.8 | 968 | −25 | XXX |
| 16 | 44.2 | 970 | −45 | ○○○ | 25.4 | 968 | −70 | ○○○ | 56.9 | 969 | −25 | XXX |
| 17 | 45.5 | 912 | −15 | XXX | 23.8 | 916 | −35 | XXX | 55.8 | 915 | 0 | XXX |
| 18 | 44.6 | 932 | −10 | XXX | 25.4 | 918 | −30 | XXX | 56.7 | 926 | +5 | XXX |
| 19 | 43.9 | 913 | −15 | XXX | 26.1 | 920 | −35 | XXX | 58.2 | 918 | 0 | XXX |
| 20 | 42.9 | 947 | −10 | XXX | 25.3 | 938 | −20 | XXX | 56.5 | 943 | +5 | XXX |
| 21 | 44.2 | 926 | −10 | XXX | 24.8 | 932 | −30 | XXX | 57.2 | 930 | +5 | XXX |

TS: Tensile Strength

TABLE 4-2

| | Example 3 | | | | Example 4 | | | |
|---|---|---|---|---|---|---|---|---|
| Steel No. | {110}L/T | TS [MPa] | vTrs100 [° C.] | Burst test (−40° C.) | {110}L/T | TS [MPa] | vTrs100 [° C.] | Burst test (−60° C.) |
| 1 | 26.8 | 1022 | −40 | ○○○ | 14.3 | 1018 | −60 | ○○○ |
| 2 | 26.5 | 1028 | −40 | ○○○ | 16.1 | 1033 | −60 | ○○○ |
| 3 | 23.5 | 1018 | −40 | ○○○ | 18.2 | 1025 | −60 | ○○○ |
| 4 | 27.9 | 1015 | −40 | ○○○ | 14.9 | 1019 | −60 | ○○○ |
| 5 | 25.6 | 1019 | −40 | ○○○ | 14.8 | 1015 | −60 | ○○○ |
| 6 | 23.7 | 1035 | −45 | ○○○ | 14.3 | 1038 | −65 | ○○○ |
| 7 | 24.2 | 1028 | −45 | ○○○ | 15.6 | 1032 | −65 | ○○○ |
| 8 | 25.3 | 1025 | −40 | ○○○ | 15.9 | 1028 | −60 | ○○○ |
| 9 | 26.4 | 1022 | −40 | ○○○ | 16.8 | 1029 | −60 | ○○○ |
| 10 | 27.3 | 1065 | −50 | ○○○ | 18.1 | 1072 | −65 | ○○○ |

TABLE 4-2-continued

|  | Example 3 | | | | Example 4 | | | |
|---|---|---|---|---|---|---|---|---|
| Steel No. | {110}L/T | TS [MPa] | vTrs100 [° C.] | Burst test (−40° C.) | {110}L/T | TS [MPa] | vTrs100 [° C.] | Burst test (−60° C.) |
| 11 | 23.9 | 1025 | −40 | ○○○ | 15.7 | 1030 | −60 | ○○○ |
| 12 | 25.1 | 1024 | −40 | ○○○ | 13.9 | 1020 | −60 | ○○○ |
| 13 | 26.7 | 1019 | −40 | ○○○ | 14.7 | 1023 | −60 | ○○○ |
| 14 | 24.6 | 1054 | −40 | ○○○ | 13.4 | 1061 | −60 | ○○○ |
| 15 | 26.2 | 1071 | −45 | ○○○ | 13.6 | 1065 | −65 | ○○○ |
| 16 | 25.6 | 1080 | −55 | ○○○ | 15.7 | 1068 | −70 | ○○○ |
| 17 | 23.8 | 1031 | −10 | XXX | 13.6 | 1028 | −20 | XXX |
| 18 | 24.3 | 1022 | −5 | XXX | 14.7 | 1018 | −15 | XXX |
| 19 | 26.6 | 1010 | −15 | XXX | 16.2 | 1012 | −25 | XXX |
| 20 | 25.8 | 1048 | −5 | XXX | 15.4 | 1049 | −15 | XXX |
| 21 | 27.2 | 1026 | −10 | XXX | 14.4 | 1020 | −25 | XXX |

TS: Tensile Strength

As can be seen from Table 4, the steel pipes of Steels Nos. 1-16 of Examples 1-4 which had a steel composition according to the present invention and a value for {110}L/T of at most 50 had a high strength at the level of at least 900 MPa in tensile strength, good toughness at the level of a vTrs100 of −40° C. or below, and good resistance to bursting in that there was absolutely no progression of cracks in a burst test at −40° C. or below.

In particular, in Examples 2 and 4 in which the reduction of area in cold working was at most 40% and {110}L/T was at most 30 and at most 20, respectively, the values of vTrs100 were −60° C. or below indicating that the toughness was further improved, and even when the burst test temperature was lowered to −60° C., they exhibited excellent resistance to bursting in that there was absolutely no progression of cracks.

In contrast, in Comparative Example 1, although the steel composition was the same, the reduction of area during cold working exceeded 65%, and {110}L/T was greater than 50 indicating that the anisotropy of the steel pipe became too great. As a result, the values of vTrs100 were in the range of −15° C. to −25° C., which indicates that the desired toughness was not obtained. In a burst test at −40° C., for all the steel compositions, cracks which progressed to the ends of the pipe were observed for each of the three steel pipes which were tested, and resistance to bursting was inferior.

A correlation between the value of VTrs100 and the results of the burst test (the resistance to bursting) was found for all the examples and comparative examples. It can be seen that if the value of vTrs100 was lower than the temperature at which the burst test was carried out, the resistance to bursting was good. Accordingly, it can be seen from Table 4 that even if a burst test, which is troublesome to perform, is not carried out, resistance to bursting can be predicted just from the value of vTrs100.

The tensile strength of the steel pipes was on the 900 MPa level for Examples 1 and 2, but by changing the conditions of cold working for the same steel compositions, the tensile strength of Examples 3 and 4 increased to the 1000 MPa level. Thus, according to the present invention, the tensile strength of a steel pipe for an airbag inflator can be adjusted to the necessary level depending on the specifications for the airbag.

Even if the requirement of the present invention that the value of {110}L/T be at most 50 is satisfied, if the steel composition, and particularly the value of [Mn+40Ti] specified by Equation (2) or the Cr content is outside the range specified by the present invention, although the tensile strength remains at the same level, the target value of −40° C. or below for vTrs100 cannot be achieved, and it greatly increased in both the examples and comparative examples. In particular, in Example 4, the values of vTrs100 were from −60° C. to −70° C. for Steels Nos. 1-16 which were steels according to the present invention, but it was from −15° C. to −25° C. for Steels Nos. 17-21 which were comparative steels. The difference was an extremely large value of around 45° C. In the other examples as well, this difference in each example was around 30° C., and in the Charpy impact test results, a marked difference was observed between the steels according to the present invention and the comparative steels. As a result, with the steel pipes of these comparative steels, crack propagation to the ends of a pipe occurred in each of the three pipes which were tested in the burst test indicating that the resistance to bursting was inferior.

The invention claimed is:

1. A steel pipe for use in an airbag inflator, which has a steel composition comprising, in mass %, C: 0.05-0.20%, Si: 0.1-1.0%, P: at most 0.025%, S: at most 0.010%, Cr: 0.05-1.45%, Al: at most 0.10%, one or both of Ti and Mn in amounts satisfying the following equations (1) and (2), $$Ti \leq 0.02\% \tag{1}$$

$$0.4\% \leq Mn + 40Ti \leq 1.2\% \tag{2}$$

Mo: 0-1.0%, Ni: 0-1.5%, V: 0-0.2%, B: 0-0.005%, Cu: 0-0.5%, Nb: 0-0.1%, Ca: 0-0.01%, Mg: 0-0.01%, REM: 0-0.01%, and a remainder of Fe and impurities, wherein the ratio (referred to below as {110}L/T) of the X-ray integrated intensity ratio for the {110} plane measured in a cross section perpendicular to the axial direction L of the steel pipe to the X-ray integrated intensity ratio for the {110} plane measured in a cross section perpendicular to the circumferential direction T of the steel pipe is at least 13.4 and at most 50, and the steel pipe has a tensile strength of at least 900 MPa and a low temperature toughness corresponding to a value of vTrs100 of −40 degrees C. or below.

2. A steel pipe as claimed in claim 1 wherein the steel composition contains one or more elements selected from at least one group of the following groups (I), (II), and (III):
 (I) one or more of Mo: 0.05-1.0%, Ni: 0.05-1.5%, V: 0.01-0.2%, and B: 0.0003-0.005%,
 (II) one or both of Cu: 0.05-0.5% and Nb: 0.003-0.1%, and
 (III) one or more of Ca: 0.0003-0.01%, Mg: 0.0003-0.01%, and REM: 0.0003-0.01%.

3. A steel pipe as claimed in claim 1 wherein the steel composition contains at least 0.2 mass % of Mn.

4. A steel pipe as claimed in claim 1 wherein the ratio {110}L/T is at least 13.4 and at most 30.

5. A steel pipe as claimed in claim 4 having a tensile strength of at least 1000 MPa and wherein the ratio {110}L/T is at least 13.4 and at most 20.

6. A steel pipe as claimed in claim 1 which has not undergone heat treatment at a temperature of the $Ac_1$ transformation point of the steel or higher after cold working.

7. A process of manufacturing a steel pipe for use in an airbag system as claimed in claim 1 comprising making an initial pipe from a steel having a prescribed steel composition, heating the pipe to a temperature of at least the $Ac_1$ transformation point of the steel followed by quenching, tempering the quenched pipe at a temperature lower than the $Ac_1$ transformation point, and then performing cold working on the pipe.

8. A process as claimed in claim 7 wherein the pipe is subjected to stress relief annealing at a temperature lower than the $Ac_1$ transformation point after cold working.

9. A process as claimed in claim 7 wherein the heating temperature before quenching is a temperature of the $Ac_3$ transformation point of the steel or higher.

10. A process as claimed in claim 9 wherein the heating temperature is in the range of 900-1000° C.

11. A process as claimed in claim 9 wherein heating to the heating temperature is carried out at a rate of temperature increase of at least 10° C./sec.

12. A process as claimed in claim 11 wherein the heating is performed by high frequency induction heating.

13. A process as claimed in claim 7 wherein the quenching is performed such that the cooling rate at least in the temperature range of 850° C. to 500° C. is at least 20° C./sec.

14. A process as claimed in claim 7 wherein the cold working is performed such that it produces a reduction of area of at most 65%.

15. A process as claimed in claim 14 wherein the reduction of area is at most 40%.

16. An airbag inflator comprising a steel pipe as claimed in claim 1.

* * * * *